UNITED STATES PATENT OFFICE.

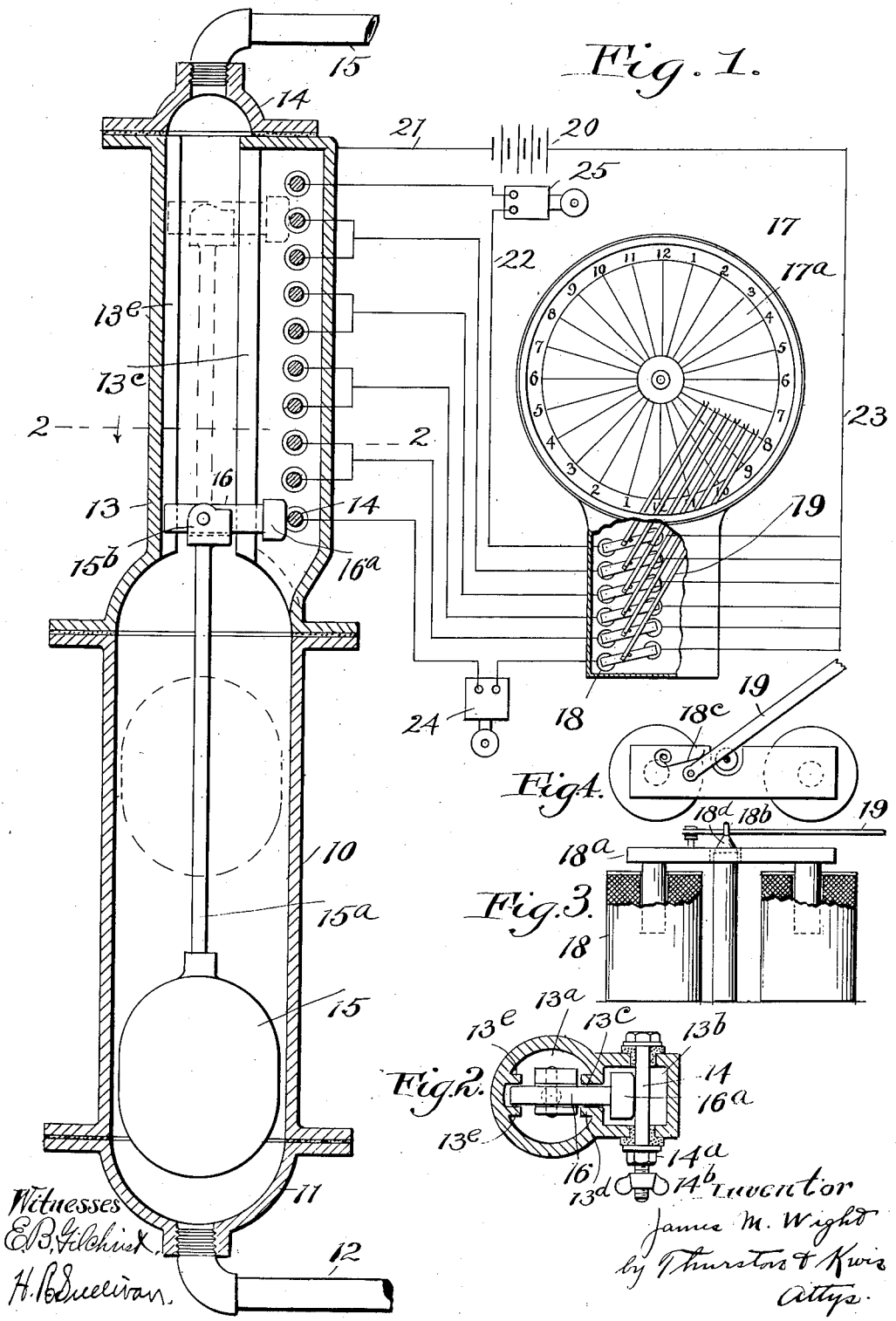

JAMES M. WIGHT, OF LAKEWOOD, OHIO.

WATER-LEVEL RECORDER.

1,179,486. Specification of Letters Patent. Patented Apr. 18, 1916.

Application filed April 5, 1912. Serial No. 688,575.

*To all whom it may concern:*

Be it known that I, JAMES M. WIGHT, a citizen of the United States, residing at Lakewood, in the county of Cuyahoga and State of Ohio, have invented a certain new and useful Improvement in Water-Level Recorders, of which the following is a full, clear, and exact description.

This invention relates to an electric water level recorder for use with steam boilers and has for its object the provision of a recorder which is efficient, which is not liable to get out of order and which makes an accurate record of changes in the water level of a boiler during a given period of time.

My invention may be here briefly summarized as consisting in certain novel combinations and arrangements of parts which will be described in the specification and set forth in the appended claims.

In the accompanying drawings, Figure 1 is a sectional view through that part of the recorder which is intended to be connected to the boiler, and a diagrammatic representation of the recording instrument, together with the electrical connections; Fig. 2 is a transverse sectional view substantially along the line 2—2 of Fig. 1, looking in the direction indicated by the arrow; Fig. 3 is an elevation of one of the magnets and one of the markers used in the recording instrument, this view illustrating one form of construction which may be employed effectively; and Fig. 4 is a top view of the same.

The water level recorder includes a float chamber 10 in which the water stands to the level of the water in the boiler. At the lower end of the float chamber is a cap 11, to the bottom of which is connected a water pipe 12 adapted to be connected to the water side of the boiler. At the upper end of the float chamber 10 is an upright extension 13 which is secured to but insulated from the lower main part of the float chamber and at the upper end of this extension is a cap 14, to the top of which is connected a steam pipe 15, which will extend to the steam side of the boiler. The cap 14 is secured to the upper end of the extension 13, but is insulated therefrom. The extension 13 comprises, as illustrated in Figs. 1 and 2, a substantially circular compartment 13ª which is concentric with the lower part of the float chamber, and at the side of the compartment is a second compartment 13ᵇ which may be rectangular in cross section, as illustrated in Fig. 2. These two compartments are in communication with each other, being connected together by a vertical slot 13ᶜ which is formed between a pair of upright guide flanges 13ᵈ. Directly opposite these flanges 13ᵈ on the inner wall of the compartment 13ª are a pair of guide ribs 13ᵉ. The compartment 13ᵇ is provided with a vertical series of equally spaced contact members 14 which consist preferably of bolts which pass transversely through the upright parallel side walls of the compartment 13ᵇ, the bolts being well insulated from the walls and being held securely in position so that insulating plugs may well withstand the steam pressure, by a tightly screwed nut 14ª. Between this nut 14ª and a thumb nut 14ᵇ, electric conductors are adapted to be connected, as will be explained.

Within the float chamber 10 is a float 15 which rises and falls with the changes in water level in the float chamber. This float has an upwardly extending rod 15ª, the upper end of which is bifurcated or forked, as shown at 15ᵇ, and is at all times within the float chamber extension 13.

Pivotally connected in the fork or bifurcation 15ᵇ at the upper end of the rod 15ª is a brush or movable contact member 16, which moves up and down with the float and has its rear end or tail extending between the vertical ribs 13ᵉ and its forward portion extending through the slot 13ᶜ, between the flanges 13ᵈ. Within the compartment 13ᵇ, this movable contact member 16 is provided with a contact head 16ª which is adapted to bear against the contact bolts 14 successively, as said movable contact member moves up and down within the compartment 13ᵇ. The forward end of the movable contact member 16 being considerably heavier than its rear end, the member 16 tips or swings so as to bear yieldingly against the contact bolt which happens at any particular water level to be opposite the head of the member 16. This construction enables good electrical contact to be made between the member 16 and the contacts 14, and also allows the movable contact member to ride up or down freely along the contacts 14, without affecting in any way the free and unhindered movement of the float 15 in direct accordance with changes in the water level. The shank or body of the movable contact member 16 is only slightly narrower than the space between the guide ribs 13$^e$ and the guide flanges 13$^d$, and in consequence of this, and as a result of making one side of the fork which supports the contact member 16$^e$ slightly heavier than the other, this contact member bears against one of the ribs and one of the flanges at all times. I therefore have good electrical contact between the contact member 16 and the insulated contacts 14 and between the member 16 and the walls of the extension 13 without causing material resistance to movement and without the necessity for the use of springs whose tension would be quickly varied or destroyed at the high temperatures within the steam space.

In connection with the apparatus described, I employ a recording instrument 17 which includes a dial or record sheet 17$^a$ driven by a clockwork mechanism not shown, and having on its face hour divisions. Preferably, the dial is sub-divided for a period of twenty four hours, although of course, this feature can be varied to suit requirements. The instrument also includes a series of magnets 18, each of which is associated with and is adapted to actuate a marker 19 arranged to mark on the dial 17$^a$. The magnets are adapted to be successively energized from a source of current which in this case is a battery 20. One side of the battery is connected by a conductor 21 to some part of the wall of the extension 13. Consequently, this side of the battery is electrically connected to the movable contact member 16 by reason of the engagement of the latter with some part or parts of the walls of the extension as previously explained. The several insulated stationary contacts 14 are connected by conductors 22 to the several magnets 18 and the latter are all connected to a common return conductor 23 connected to the opposite side of the battery. Although I may, if desired, employ a separate contact member for each magnet, I have shown contact members 14 between the lowermost and uppermost arranged in pairs, the pairs connected to the different magnets. This, however, is a matter of no consequence, and is immaterial to the invention. In this instance, the several markers 19 are intended to all mark continuously upon the face of the dial, as the latter is rotated, and the markers normally have certain predetermined positions with reference to the dial. Each magnet is in this case arranged so that when it is energized, it shifts laterally from normal position, the marking or recording end of a marker, and as a result of this lateral movement, there will be an inward or outward deviation of the mark from the true circle which would otherwise be marked by said marker. In other words, each time the magnet is energized, the corresponding marker is caused to make a jog in the circle which it is intended to mark, the marker being restored to normal position when the magnet is again deënergized.

By referring to Figs. 3 and 4, it will be seen that the rear ends of the markers are pivotally connected to the armatures 18$^a$ of the magnets, each marker being held in certain definite position with reference to the armature, and with reference to a stop member 18$^b$ by a small and rather delicate spring 18$^c$. As the armature is attracted toward the coil or coils of the magnet, the marker is carried down with it, and as it descends, it engages a deflecting cone or beveled surface 18$^d$ which throws the marker somewhat to one side of its normal position. Of course, it will be understood that the vertical movement of the armature of each magnet and the lateral deviation of the marker are very slight.

It will be seen that as the movable contact member 16 moves up and down, the circuit is completed successively through the several magnets, and as a result, the several markers are successively actuated so that by the jogs or deviations from their normal positions, any changes in the water level during the given period of time is recorded.

I prefer also to provide high and low water alarms in connection with the recording system, preferably in the form of bells 24 and 25, in circuit respectively with the lowermost and uppermost contact members 14 and corresponding magnets, so as to notify the operator when the water level reaches a predetermined low limit and a predetermined high limit.

An important advantage of this water level recorder is that a record of the several times that the float chamber is "blown out" is accurately recorded on the dial.

Having thus described my invention, what I claim is:—

1. In a water level recorder for boilers, a float chamber adapted to be connected with the water and steam sides of a boiler, a float in the chamber, a series of insulated contacts carried by the chamber above the water level therein, an arm projecting from the float, and a pivoted contact member secured to the end of said arm and adapted to engage the different contacts successively as the float is raised or lowered, and an electrically controlled recorder connected to said contacts.

2. In a water level recorder for boilers, a float chamber adapted to be connected to the water and steam sides of a boiler, a float in the chamber, an arm carried by the float, a contact member pivotally connected to the end of the arm, a series of stationary contacts arranged at one side of the axis of movement of said arm, said contact member being pivoted to the arm at one side of the center of gravity of said member so that the latter will tip toward and bear yieldingly against the contacts, and an electrically controlled recorder connected to said contacts.

3. In a water level recorder for boilers, a float chamber adapted to be connected to the water and steam sides of a boiler, a float in the chamber, a series of contacts arranged in vertical alinement at one side of the axis of movement of the float, a pivoted contact member carried by the float, said contact member extending transversely of the axis of movement of the float, and at its end toward the contacts being weighted, so that it will bear by gravity against the contacts and engage the same successively as the float is raised and lowered, and an electrically operated recorder connected to said contacts.

In testimony whereof, I hereunto affix my signature in the presence of two witnesses.

JAMES M. WIGHT.

Witnesses:
H. R. SULLIVAN,
A. F. KWIS.